United States Patent [19]

Bleijerveld et al.

[11] Patent Number: 4,586,042
[45] Date of Patent: Apr. 29, 1986

[54] VIDEO EXTRACTOR

[75] Inventors: Hendrik C. Bleijerveld, Borne; Willem Van Den Berg, Apeldoorn, both of Netherlands

[73] Assignee: Hollandse Signaalapparaten B.V., New York, N.Y.

[21] Appl. No.: 474,620

[22] Filed: Mar. 11, 1983

[30] Foreign Application Priority Data

Mar. 19, 1982 [NL] Netherlands .......................... 8201144

[51] Int. Cl.⁴ ............................ G01S 7/28; G01S 7/44
[52] U.S. Cl. ................................................ 343/5 VQ
[58] Field of Search ........................... 343/5 DP, 5 VQ

[56] References Cited

U.S. PATENT DOCUMENTS

| 3,981,008 | 9/1976 | Mann | 343/5 DP |
| 4,070,673 | 1/1978 | Schmidt et al. | 343/7.3 |
| 4,243,988 | 1/1981 | Käng et al. | 343/5 VQ |
| 4,357,607 | 11/1982 | Van der Heijden et al. | 343/5 VQ |

FOREIGN PATENT DOCUMENTS 2351511 10/1973 Fed. Rep. of Germany .
0066271 5/1982 Fed. Rep. of Germany .

Primary Examiner—T. H. Tubbesing
Assistant Examiner—Mark Hellner
Attorney, Agent, or Firm—Robert J. Kraus

[57] ABSTRACT

A video extractor for a pulse radar apparatus comprises a memory capable of storing a number of words corresponding with the number of range quanta, into which the range interval of the pulse radar apparatus is divided. The rate at which words are shifted in and out of memory corresponds with the counting rate of the range counter of the pulse radar apparatus. A video processor updates the target information in the words in response to video, angular and range data from the pulse radar apparatus. The target information contains at least the initial azimuth value jb(r), the final azimuth value je(r), the weight E(r) and the target number N of a series of hits established in the range quantum r. A processor, receiving at least the above information from the video processor determines the center (MR, Mφ), the direction ∅, the length L, the width B and the weight $E_o$ of the target.

13 Claims, 13 Drawing Figures

VIDEO EXTRACTOR

The invention relates to a video extractor for use in a pulse radar apparatus, comprising: a memory capable of storing a number of words corresponding with the number of range quanta, into which the range interval to be covered by the pulse radar apparatus is divided, said words containing target information as established for each range quantum; a range counter, whose counting rate is equal to the rate at which words are shifted in and out of memory; a video processor which receives the words shifted out of memory and which, in response to the video and angular data from the pulse radar apparatus and to the range data provided by the range counter, updates the target information contained in said words with each successive range sweep, and transfers the words back into memory.

Such a video extractor is known from the U.S. Pat. No. 4,357,607. The video extractor described in this patent specification comprises a video processor, which transfers the target information in the particular words to following or preceding words fetched from memory. All information referring to one target can thus be concentrated in a single word. This word contains the information needed to determine the circumscribed annular sector of the target, as well as the range of the earliest appearing and the furthest extending series of hits contributing to the buildup of a target, and is supplied, after readout, to a processor to determine therefrom the target position, while in many cases it gives an indication as to the direction and the length of the target. However, a feasible and accurate determination of the target direction and dimensions, both in length and in width, under all circumstances, cannot be achieved with the known video extractor. Moreover, because no allowance is made for the different echo strengths within the circumscribed annular sector, the centroid within this sector and hence the target position cannot be determined correctly. The present invention has for its object to provide a video extractor, in which these disadvantages are obviated.

According to the invention, the video processor thereto comprises: a circuit for determining the initial and final azimuth values jb(r) and je(r), respectively, of a series of hits for each range quantum r, whenever such a series of hits is established therein; a circuit for determining the weight E(r) of a series of hits for each range quantum r, whenever such a series of hits is established therein; a circuit for assigning one and the same target number N to the series of hits established in successive range quanta if such series of hits together form the picture of a single target; and a readout unit for supplying for the successive range quanta, the respective quantity r and the respective quantities jb(r), je(r), E(r) and N, forming part of said words, to a processor, which processor determines from said quantities, in so far as they have the same target number, the centre (MR, M$\phi$), the direction $\emptyset$, the length L, the width B, and the weight $E_o$ of the target. That is, instead of supplying the processor with one word containing all target information, this processor receives a word for each range quantum, in which a series of hits contributing to the buildup of a target is detected, and because the same target number is assigned to such series of hits, it is possible to combine the information contained in the separate words for determining the target parameters.

The invention will now be described with reference to the accompanying figures, of which:

Figure 1:
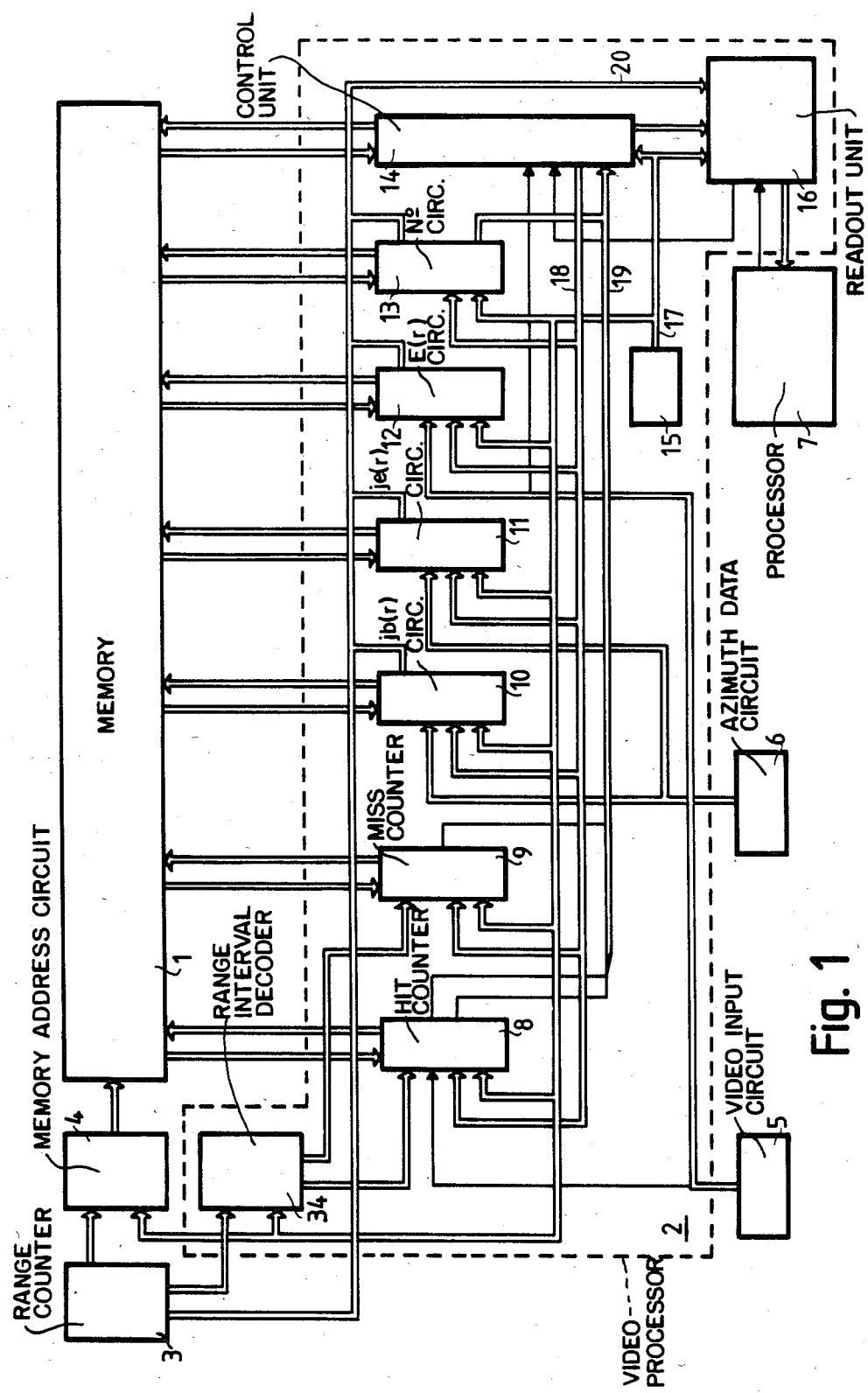
FIG. 1 is a block diagram of an embodiment of the video extractor according to the invention.

The video extractor, as shown in FIG. 1, consists of a memory 1, a video processor 2, a range counter 3, a memory address circuit 4, a video input circuit 5, an azimuth data circuit 6, and a processor 7.

In the embodiment here described, memory 1 consists of RAMs used as shift memory for 4096 words of 68 bits. The numbering of the words is recorded in the range counter 3; hence, for each range quantum one word is available in memory 1. The memory addressing is therefore performed by a memory address circuit 4 controlled by range counter 3.

In the embodiment in question the 68-bit words are arranged as follows:

(a) 8 bits for the number of hits recorded in a particular range quantum r; a hit constitutes here that part of a quantised video signal that exceeds a certain threshold level and that falls within a range quantum r.

(b) 6 bits for the number of misses recorded in a particular range quantum r; i.e. the number of times that no hits have been established in a particular range quantum.

(c) 13 bits for the initial azimuth value jb(r) of a series of hits established in a particular range quantum r.

(d) 13 bits for the final azimuth value je(r) of a series of hits established in a particular range quantum r.

(e) 18 bits for the weight E(r) of a series of hits established in a particular range quantum r; the weight constitutes here the sum of the hit strengths measured in, say, amplitude or energy contents.

(f) 7 bits for the target number N for the series of hits contributing to the buildup of a single target.

(g) 3 bits containing the control code for executing the various control functions.

In the initial position the control code is 000. If a first hit is received in a range quantum, the control code for this range quantum is 001. If in this range quantum the number of hits established is such that this series of hits is presumed to represent a target or a part of a target, the control code for this range quantum is 011; in this case, the series of hits meets the so called first detection criterion. If the number of hits is such that the series of hits definitely represents a target or a part of a target, the control code for this range quantum is 010; in this case, the series of hits meets the socalled second detection criterion. If in the range quantum a certain number of misses are established after a series of hits, the control code is 101; in this case, the socalled miss criterion is reached. The control code 111 indicates that the miss criterion has been met after the series of hits has reached the first detection criterion, while control code 110 indicates that the miss criterion has been met after the series of hits has reached the second detection criterion.

To update the aforementioned data stored in memory 1 with each new randar sweep, video processor 2 comprises; a hit counter 8; a miss counter 9; a circuit 10, hereinafter referred to as the jb(r) circuit, for determining the initial azimuth value jb(r) of a series of hits for each range quantum r whenever a first hit of such a series of hits is established therein; a circuit 11, hereinafter referred to as je(r) circuit, for determining the final azimuth value je(r) of a series of hits for each range quantum r whenever such a series of hits is established therein; a circuit 12, hereinafter referred to as E(r) circuit, for determining the weight E(r) of a series of hits for each quantum r whenever such a series of hits is established therein; a circuit 13, hereinafter referred to as numbering circuit, for assigning one and the same target number N to the series of hits established in successive range quanta if such series of hits together form the picture of one target; a control unit 14; a timing pulse generator 15; and a readout unit 16. The timing pulse generator 15 supplies the remaining circuits of video processor 2 with clock pulses via line 17. Control unit 14 supplies the various circuits of video processor 2 with control signals via line 18 and receives control signals from hit counter 8, miss counter 9 and numbering circuit 13 via line 19. Furthermore, the function of the control signals is described with reference to FIGS. 6 to 12. The quantities r, jb(r), je(r), E(r) and N are fed to readout unit 16 via line 20; these quantities are accompanied with a status bit from control unit 14. From control unit 16 the above-mentioned information of the hit cluster is passed to processor 7.

Figure 2:
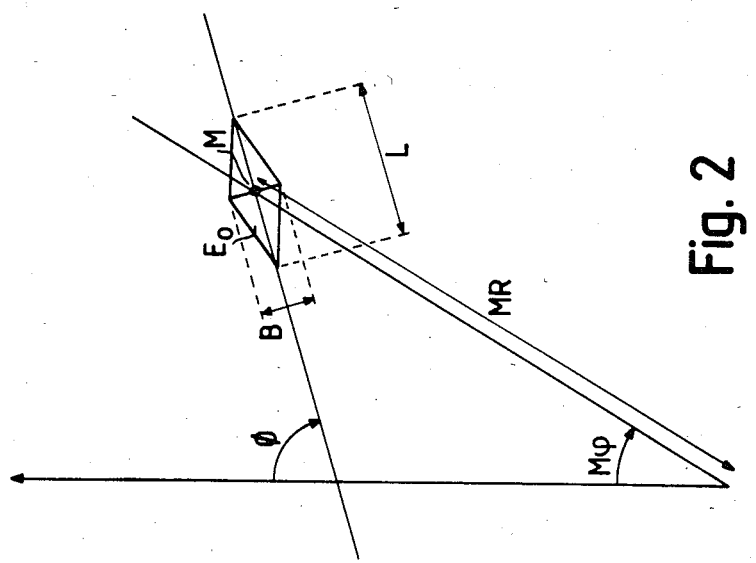
FIG. 2 is a diagram illustrating the target parameters to be determined.

Processor 7 has several functions, viz.:

(a) to determine the target parameters: the range MR from the target centre to the pulse radar apparatus, the azimuth $M\phi$ of this centre with respect to a reference direction, the direction $\phi$ of the target with respect to this reference direction, the length L and the width B of the target, and the weight $E_o$ of the target, i.e. the intensity of the signal reflected by the target. The above target parameters are illustrated in FIG. 2.

(b) to erase the successively supplied information referring to one target if the target fails to meet certain conditions, in particular if it fails to meet the second detection criterion.

(c) to combine the information from targets initially regarded to be non-coherent, if these later appear to belong to a single target.

These three functions will first be described. As soon as the processor 7 has recorded the first set of data r, jb(r), je(r), E(r) and N of a range quantum, containing a series of hits contributing to the buildup of a target, the relative target coordinates Rrel and jrel are established; in the embodiment in question the values r and jb(r) of this first set of data are taken for this purpose. The memory forming part of processor 7 stores the relative target coordinates at a location determined by the target number N. Furthermore, in this memory, space is reserved for the values:

$$E_o = \Sigma E(r),$$

which is the weight of the target to be determined, $$E_R = \Sigma E(r) \cdot [r - Rrel],$$

$$E_{RR} = \Sigma E(r) \cdot [r - Rrel]^2,$$

$$E_S = \tfrac{1}{2} \Sigma E(r) \cdot [(jb(r) - jrel) + (je(r) - jrel)],$$

$$E_{SS} = \tfrac{1}{2} \Sigma E(r) \cdot [(jb(r) - jrel)^2 + (je(r) - jrel)^2]$$

and $$E_{RS} = \tfrac{1}{2} \Sigma E(r) \cdot [r - Rrel] \cdot [(jb(r) - jrel) + (je(r) - jrel)],$$

and for the values of the circumscribed annular sector of the target: Rmin, Rmax, jmin and jmax. These values are expressed in numbers of range quants and in angular units, respectively. Each time the processor 7 receives a set of data r, jb(r), je(r), E(r) and N of a subsequent range quantum, in which a series of hits contributing to the buildup of the target is established, the values $E_o$, $E_R$, $E_{RR}$, $E_S$, $E_{SS}$ and $E_{RS}$ are updated, and it is determined whether the Rmin and Rmax values must be replaced by the last-received r value or the values jmin and jmax by the last-received jb(r) and je(r) values, respectively. After receiving the last set of data r, jb(r), je(r), E(r) and N, i.e. the data about the furthest extending series of hits contributing to the buildup of the target, processor 7 continues with further operations, but only if a status bit condition has been met; this condition means that the second detection criterion is met in the range quantum, in which the furthest extending series of hits contributing to the buildup of a target is recorded, implying that the complete target has met this criterion. Failing compliance with this condition, the stored series of hits will be erased.

Figure 3:
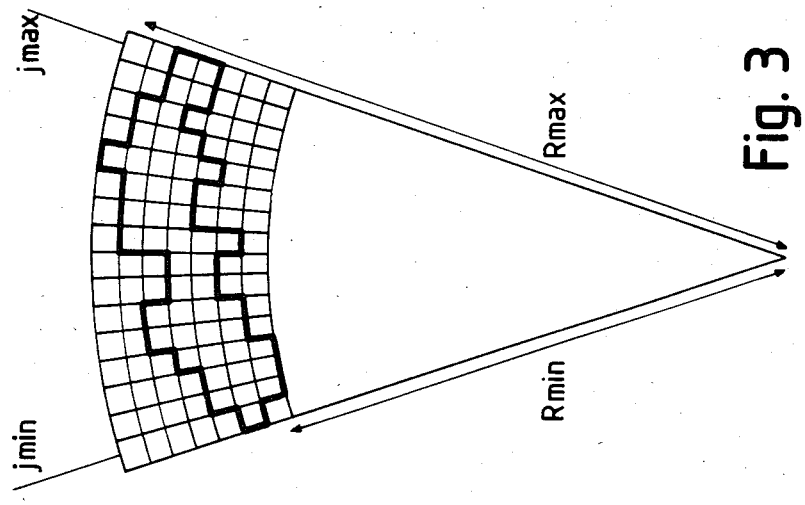
FIGS. 3, 4 and 5 are diagrams useful in explaining the various processor operations.
Figure 4:
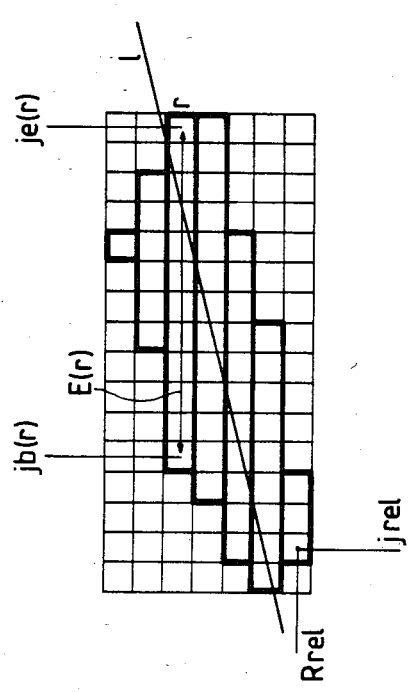

FIG. 3 shows a target circumscribed in the sector bounded by Rmin, Rmax, jmin and jmax. This target is shown in rectangular coordinates in FIG. 4; it should be noted that it is immaterial whether in the data supplied for each range quantum to processor 7 a series of hits is interrupted by a limited number of misses.

Applying the least squares method as a mathematical basis and taking into account the weights E(r) of the series of hits received in the relevant range quanta, the processor 7 determines the direction $\alpha$ of the line 1 with respect to the line from the pulse radar apparatus to the target video "centroid". To this effect, the coordinates of the video centroid ZRrel, Z$\phi$rel, expressed in numbers of range quanta and angular units, are determined with respect to the relative target coordinates, using the relations:

$$ZRrel = \frac{E_R}{E_o} \text{ and } Z\phi rel = \frac{E_S}{E_o}.$$

Then the relative central moments $C_{RR}$, $C_{SS}$ and $C_{RS}$ are determined from the relations:

$$C_{RR} = E_{RR} - E_o \cdot (ZRrel)^2,$$

$$C_{SS} = E_{SS} - E_o \cdot (Z\phi rel)^2$$

and $$C_{RS} = E_{RS} - E_o \cdot (ZRrel) \cdot (Z\phi rel).$$

Of these moments, $C_{RR}$ and $C_{SS}$ must be corrected for antenna beam width and radar pulse length. The corrected relative central moments are then determined from the relations:

$$VAR_{RR} = \text{Max}\{C_{RR} - E_o \cdot \sigma_R^2, 0\} \cdot (\Delta R)^2,$$
$$VAR_{SS} = \text{Max}\{C_{SS} - E_o \cdot \sigma_S^2, 0\} \cdot$$
$$[(ZRrel + Rrel) \cdot \Delta R \cdot \Delta \phi]^2 \text{ and}$$

-continued
$$VAR_{RS} = C_{RS} \cdot \Delta R \cdot [(ZRrel + Rrel) \cdot \Delta R \cdot \Delta\phi].$$

In these relations, $$\sigma_R^2 = \frac{1}{12}\left(\frac{\frac{1}{2}c\tau}{\Delta R}\right)^2$$

where $\tau$ is the pulse duration, c the velocity of light, and $\Delta R$ the magnitude of a range quantum, while:

$$\sigma_S^2 = \frac{1}{12}(HSC)^2$$

where HSC is the number of transmitted pulses within the 3 dB antenna beam, and $\Delta\phi$ the magnitude of the selected angular units. These corrected relative moments no longer contain any quantities expressed in numbers of range quanta and angular units, but only quantities expressed in common units of length. The direction $\alpha$ of line 1 is determined from $$\tan 2\alpha = \frac{2 \cdot VAR_{RS}}{VAR_{RR} - VAR_{SS}}.$$

From the ZRrel and Z$\phi$rel values established, the coordinates of the video centroid ZR, Z$\phi$ with respect to the radar antenna and the selected reference direction are calculated from the relations:

$$ZR = (ZRrel + Rrel) \cdot \Delta R$$

and $$Z\phi = (Z\phi rel + jrel) \cdot \Delta\phi.$$

The target direction with respect to the selected reference direction will then be $\phi = \alpha + Z\phi$. For a given target length L, the target width B is given by the expression:

$$B = L \cdot \sqrt{\frac{(VAR_{RR} + VAR_{SS}) - \cos 2\alpha \cdot (VAR_{RR} - VAR_{SS}) - 2 \cdot \sin 2\alpha \cdot VAR_{RS}}{(VAR_{RR} + VAR_{SS}) + \cos 2\alpha \cdot (VAR_{RR} - VAR_{SS}) + 2 \cdot \sin 2\alpha \cdot VAR_{RS}}}$$

The target length L is taken to be the distance between the points of intersection of the longitudinal axis 1 of the target with the circumscribed annular sector corrected for antenna beam width and radar pulse length.

Figure 5:
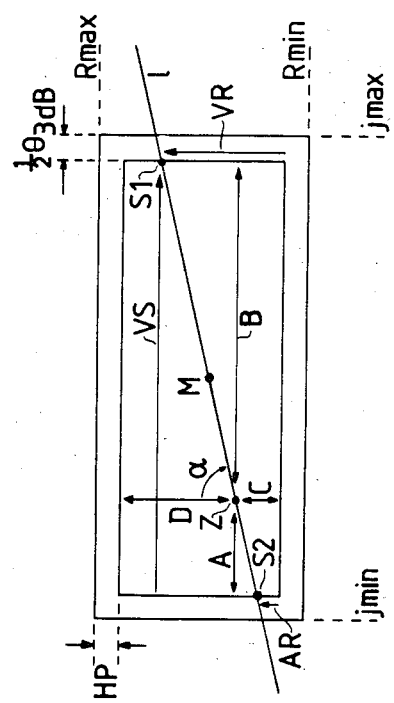

FIG. 5 shows the circumscribed annular sector (Rmin, Rmax, jmin and jmax) in rectangular coordinates and the corrected circumscribed annular sector obtained through correction by half the 3 dB antenna beam width $\frac{1}{2}\theta_{3\,dB}$ and half the radar pulse length HP. The quantities A, B, C and D, determining the position of the target video centroid Z with respect to the corrected circumscribed annular sector, can be expressed by:

$$A = \text{Max}[(ZRrel + Rrel) \cdot \Delta R \cdot \{(Z\phi rel + jrel - jmin) \cdot \Delta\phi - \tfrac{1}{2}\theta_{3\,dB}\}, 0];$$

$$B = \text{Max}[(ZRrel + Rrel) \cdot \Delta R \cdot \{(jmax - Z\phi rel - jrel) \cdot \Delta\phi - \tfrac{1}{2}\theta_{3\,dB}\}, 0];$$

$$C = \text{Max}[(ZRrel + Rrel - Rmin) \cdot \Delta R - HP, 0];$$

$$D = \text{Max}[(Rmax - ZRrel - Rrel) \cdot \Delta R - HP, 0].$$

The coordinates of the points of intersection S1 and S2 of line 1 with the corrected circumscribed annular sector, viz. (VR, VS) and (AR, AS) respectively, defined here with respect to the left-hand bottom corner of this sector, are now determined by the quantities A, B, C, D and $\alpha$. In FIG. 5, line 1 proceeds in such a way that VR = C + B cot $\alpha$, AR = C − A cot $\alpha$, VS = A + B and AS = 0. It will be clear that the mathematical expressions for VR, VS, AR and As differ if line 1 cuts sides of the circumscribed sector other than shown in FIG. 5. From the values obtained for VR, VS, AR and AS the target length is calculated from the relation:

$$L = \sqrt{(VR - AR)^2 + (VS - AS)^2},$$

and the coordinates of the target centre, viz. MR and M$\phi$, from the relations:

$$MR = Rmin + HP + \tfrac{1}{2}(VR + AR) \text{ and}$$

$$M\phi = jmin \cdot \Delta\phi + \tfrac{1}{2}\theta_{3dB} + \frac{\tfrac{1}{2}(VS + AS)}{MR}.$$

The fact that the centre of the target, instead of its centroid, is determined, is because of the centroid for certain targets may be far outside the centre; this occurs notably with cargo vessels if the pulse radar apparatus with the video extractor is operated in a harbour area.

The target parameters MR, M$\phi$, $\emptyset$, $E_o$, L and B are obtained in processor 7 in the manner shown. These parameters are used to determine the plots for presentation on a display.

As already stated, processor 7 has another two functions apart from determining the target parameters. One of these functions is very simple and concerns the erasure of the memory locations containing the values $E_o$, $E_R$, $E_{RR}$, $E_S$, $E_{SS}$, $E_{RS}$, Rmin, Rmax, jmin, jmax, Rrel and jrel; erasure of these memory locations occurs if the afore-mentioned condition for further processing of these data is not met. The other function concerns the merging of hit clusters. If the values r, jb(r), je(r), E(r) and N are received from two separate hit clusters, the values $E_o(1)$, $E_R(1)$, $E_{RR}(1)$, $E_S(1)$, $E_{SS}(1)$, $E_{RS}(1)$, Rmin(1), Rmax(1), jmin(1), jmax(1), Rrel(1), jrel(1) and $E_o(2)$, $E_R(2)$, $E_{RR}(2)$, $E_S(2)$, $E_{SS}(2)$, $E_{RS}(2)$, Rmin(2), Rmax(2), jmin(2), jmax(2), Rrel(2) and jrel(2) are stored for both clusters in processor 7 at the memory locations determined by the respective target numbers. If however these hit clusters appear to merge, one set of values is cancelled and the other set is updated with the cancelled set to form the values $E_o(N)$, $E_R(N)$, $E_{RR}(N)$, $E_S(N)$, $E_{SS}(N)$, $E_{RS}(N)$, Rmin(N), Rmax(N), jmin(N) and jmax(N), where:

$E_o(N) = E_o(1) + E_o(2)$
$E_R(N) = E_R(1) + E_R(2) + E_o(2) \cdot [Rrel(2) - Rrel(1)]$
$E_{RR}(N) = E_{RR}(1) + E_{RR}(2) + 2 \cdot E_R(2) \cdot [Rrel(2) - Rrel(1)] + E_o(2) \cdot [Rrel(2) - Rrel(1)]^2$
$E_S(N) = E_S(1) + E_S(2) + E_o(2) \cdot [jrel(2) - jrel(1)]$
$E_{SS}(N) = E_{SS}(1) + E_{SS}(2) + 2 \cdot E_S(2) \cdot [jrel(2) - jrel(1)] + E_o(2) \cdot [jrel(2) - jrel(1)]^2$
$E_{RS}(N) = E_{RS}(1) + E_{RS}(2) + E_S(2) \cdot [Rrel(2) - Rrel(1)] + E_R(2) \cdot [jrel(2) - jrel(1)] + E_o(2) \cdot [Rrel(2) - Rrel(1)] \cdot [jrel(2) - jrel(1)]$ -continued
$$Rmin(N) = Min\{Rmin(1), Rmin(2)\}$$
$$Rmax(N) = Max\{Rmax(1), Rmax(2)\}$$
$$jmin(N) = Min\{jmin(1), jmin(2)\}$$
$$jmax(N) = Max\{jmax(1), jmax(2)\}$$

With these newly produced quantities, all of which being related to Rrel(1) and jrel(1), the parameters of the new target obtained through merging of the clusters can be determined by the aforementioned method. The various functions of processor 7 here described are realised through video processor 2. This will be dealt with hereafter.

Figure 6:
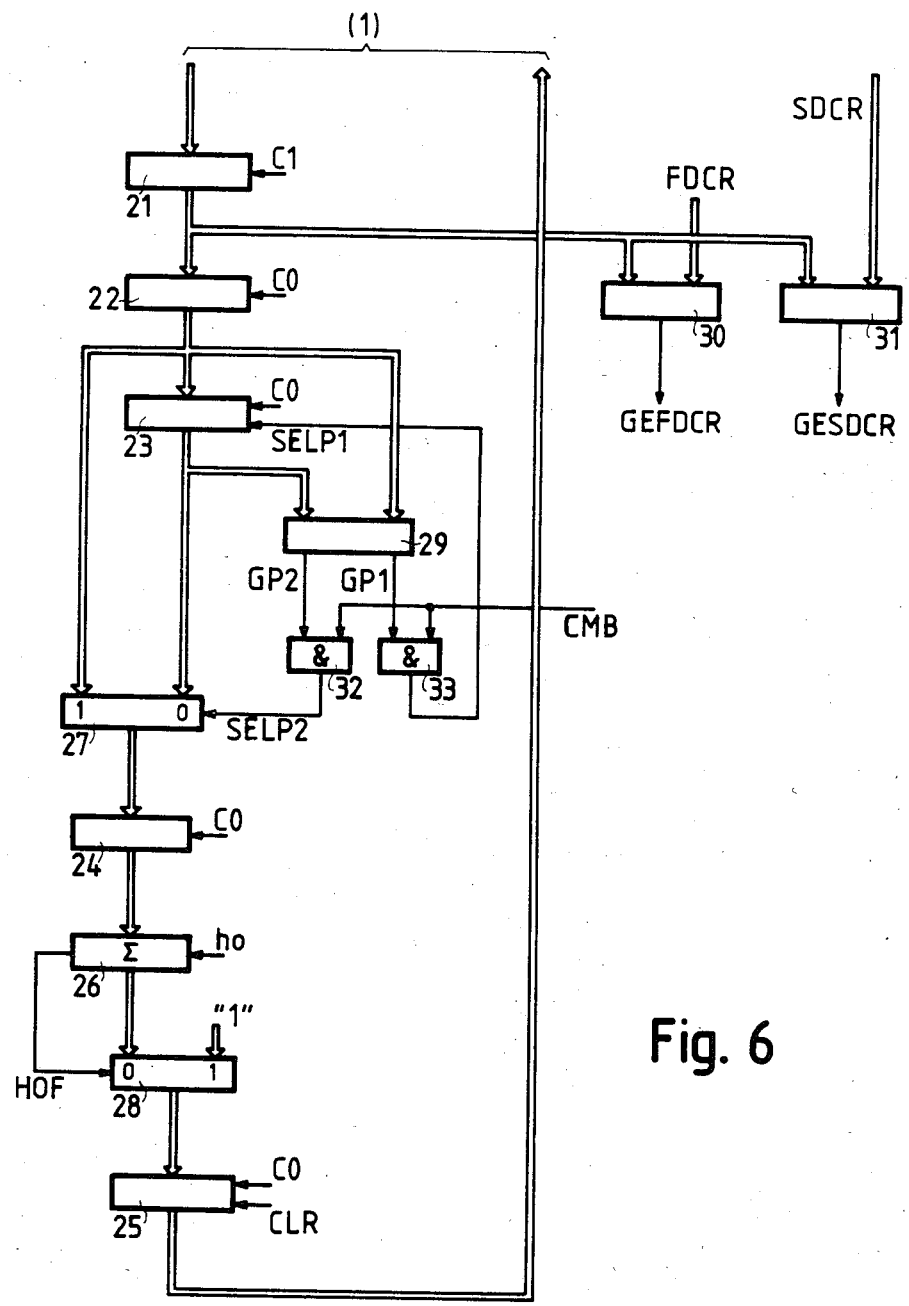
FIG. 6 is a block diagram of the hit counter.

The hit count in the word stored in memory 1 for the particular range quantum may be incremented or otherwise modified in hit counter 8. FIG. 6 shows a practical embodiment of such a hit counter. The hit counter comprises five hit counter registers 21-25, an adder circuit 26, two multiplexers 27 and 28, three comparators 29, 30 and 31 and two AND circuits 32 and 33.

If the hit counts fetched from memory 1 for the successive range quanta need not be modified other than by incrementing, the C0 and C1 clock pulses clock these counts successively into hit counter registers 21, 22 and 23, via multiplexer 27 into hit counter register 24, then via adder circuit 26 and multiplexer 28, if necessary incremented by 1, into hit counter register 25, from which they finally return to memory 1. That is, the hit counts in hit counter registers 21 to 25 represent the number of hits recorded in range quanta $k+3$, $k+2$, $k+1$, $k$, $k-1$ respectively, where k is a running index, indicating the successive range quanta into which the range is divided.

With each hit received in a particular range quantum, as indicated by signal ho from video input circuit 5 of FIG. 1, the hit count in adder circuit 26 is incremented by 1, provided this circuit has not attained its maximum value. When the hit counter reaches its maximum value, the HOF signal maintains the maximum hit count in hit counter register 25.

The hit count for each range quantum is compared with certain criteria. In comparator 30 the hit count is compared with the first detection criterion. As soon as a minimum number of hits are recorded in a range quantum, comparator 30 delivers the GEFDCR signal. In the embodiment in question, this minimum number FDCR is input via manual switches. In comparator 31 the hit count is compared with the second detection criterion. If compliance with the first detection criterion indicates that presumably a target is present in the particular range quantum, compliance with the second detection criterion will make certain of this presumption. As soon as the second detection criterion has been met, comparator 31 delivers the GESDCR signal. If desired, the second detection criterion can be made conditional on the range. For this purpose, a range interval decoder 34 is connected to range counter 3, as depicted in FIG. 1; this decoder supplies the hit counter 8 with the value SDCR of the second detection criterion. The setting of the two detection criteria depends on the concrete application of the video extractor. With all targets the number of echoes that may be expected and hence the number of hits in the range quanta involved in the various ranges can be determined from the beam width, the antenna rotational speed and the pulse repetition frequency of the radar in which the video extractor is applied.

In the case of the recording of a number of hits in two successive range quanta $k+1$ and $k+2$, it is assumed that the hits in these range quanta belong to the same target as soon as the first detection criterion has been met in the two range auanta, i.e. $D1(k+1) \cdot D1(k+2) = 1$. Since the video data processing requires the disposal of the hit count accumulated by a target, the hit counts for range quanta $k+1$ and $k+2$ should be equalised and kept equal. If subsequently there are adjoining range quanta again containing hits of the target and the number of hits meets the first detection criterion, the hit count in all range quanta involved must also be made equal to the largest hit count of those present for the particular range quanta. In this way it can be determined whether the target in its totality meets the detection criteria.

If the number of hits in range quantum $k+1$ is greater than that in range quantum $k+2$, the hit count of range quantum $k+1$, present in register 22 at that instant, must be replaced with that of range quantum $k+1$, present in register 23 at that instant. This is achieved by preventing that the contents of register 23 are overwritten with the clocking of the hit counts on the appearance of the C0 clock pulse. To this effect, comparator 29 delivers a GP1 signal to AND circuit 33, if the hit count in register 23 is greater than that in register 22. AND circuit 33 also receives the CMB signal of control circuit 14, indicating the $D1(k+1) \cdot D1(k+2) = 1$. In case $GP1 \cdot CMB = 1$, the SELP1 signal from AND circuit 33 prevents that the contents of register 22 are transferred to register 23.

If the number of hits in range quantum $k+1$ is smaller than that in range quantum $k+2$, that is when comparator 29 delivers the GP2 signal, the contents of register 23 must be replaced with that of register 22. For this reason, the AND circuit 32 delivers the SELP2 signal, when $GP2 \cdot CMB = 1$, to clock the contents of register 22, instead of that of register 23, into register 24 via multiplexer 27. The contents of register 22 will naturally be clocked into register 23 at the same time.

Figure 7:
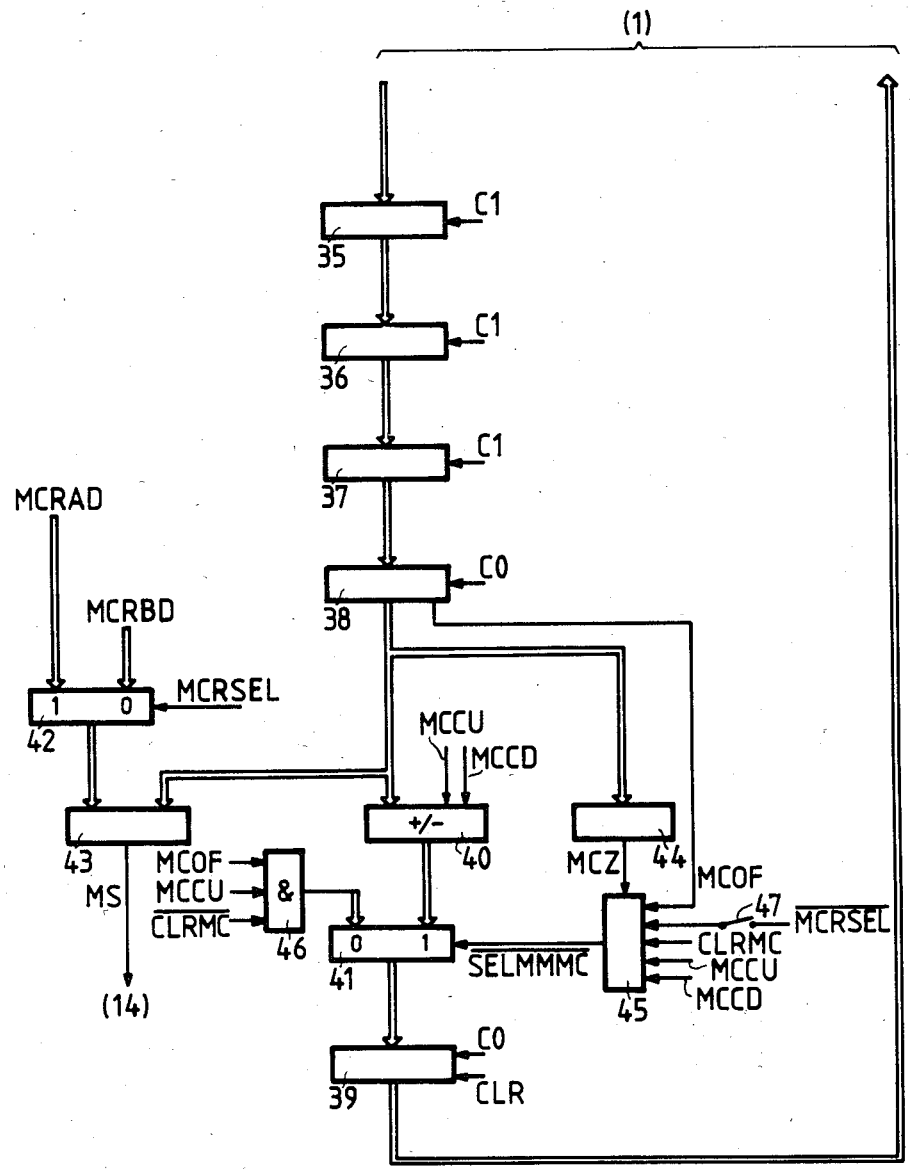
FIG. 7 is a block diagram of the miss counter.

The miss count, forming part of the word stored in the memory for the particular range quantum, is recorded in miss counter 9. FIG. 7 shows a practical embodiment of such a counter. The miss counter comprises five miss counter registers 35-39, a counting circuit 40, two multiplexers 41 and 42, a comparator 43, and three logic circuits 44-46. The miss counter can be operated in two modes by means of switch 47.

The C0 and C1 clock pulses clock the miss counts, fetched from memory 1 for the successive range quanta, in succession into miss counter registers 35, 36, 37, 38 and, via counting circuit 40 and multiplexer 41, if necessary incremented or decremented by 1, into miss counter register 39, from which they finally return to memory 1. That is, the miss counts in miss counter registers 35 to 39 are representative of the number of misses recorded in range quanta $k+3$, $k+2$, $k+1$, $k$ and $k-1$, respectively, where k is a running index, indicating the successive range quanta into which the range is divided.

With each miss recorded in the particular range quantum, i.e. no hit is received ($\bar{ho} = 1$), while previously one or several hits were recorded in this range quantum ($R(k) = 1$) and the miss criterion has not yet been met ($M(k) = 1$), the signal $MCCU = \bar{ho} \cdot R(k) \cdot M(k)$ from control circuit 14 increments the miss count in counting circuit 40 by 1. The miss criterion is reached when a sufficient number of misses have been recorded in the range quantum to assume that the series of hits, in so far as this will contribute to the buildup of a target, must be regarded as being ended. In comparator 43 the miss count is compared with the miss criterion. If this criterion is met, comparator 43 delivers an MS signal. In the embodiment in question, a distinction is made between the miss criterion before detection MCRBD and the miss criterion after detection MCRAD. The MCRSEL signal, indicating that in the particular range quantum the second detection criterion has been met, i.e. D2(k)=1, causes that MCRAD is passed to comparator 43 via multiplexer 42. If the second detection criterion is not met, the miss count is compared with MCRBD. The miss criterion before detection must be so chosen that, on the one hand, undesired short echoes will not occupy the particular range quantum for a too long a period and that, on the other hand, small interferences, incurred with the receipt of the target, will not cause this target to be erased. The miss criterion after detection must be so chosen that, on the one hand, small interferences will not cause the target to end and that, on the other hand, not a too large a shadow area is developed behind the target. The two miss criteria must be established in accordance with the concrete application of the video extractor. In the embodiment in question, MCRBD is entered via manual switches, while MCRAD is made conditional on the range in a similar way as the second detection criterion. MCRAD is therefore also obtained from range interval decoder 34.

As soon as the miss criterion before detection has been met, the word associated with the particular range quantum can be erased. The miss counter can be operated in two modes by means of a switch 47; these modes enable to delay the erasure action. For if after the recording of one or several misses, but prior to reaching the miss criterion before detection, another hit is recorded, the miss counter can be decremented by 1 or reset. The effect thereof is that certain weak echoes, which would otherwise be erased, can still be detected as coming from a target.

In the first mode of operation of the miss counter, switch 47 is in the position as shown in FIG. 7. In this mode the signal MCCD=ho·R(k)·M(k) from control circuit 14 decrements the miss count in counting circuit 40 by 1, provided this circuit is not already 0 of course. In the first mode the logic circuit 45 supplies the following signal, expressed in Boolean form:

$$\overline{SELMMMC} = \overline{MCOF \cdot MCCU} + \overline{MCZ \cdot MCCD} + \overline{CLRMC}.$$

If $\overline{SELMMMC}=1$, the miss count from counting circuit 40 can pass, via multiplexer 41, to register 39 and subsequently be returned to memory 1. If $\overline{SELMMMC}=0$, logic circuit 46 makes all bits of the miss count equal to $MCCU \cdot MCOF \cdot \overline{CLRMC}$. If the miss count must be incremented (MCCU=1), but it has already reached its maximum value (MCOF=1), then $\overline{SELMMMC}=0$ and all bits of the miss count assume the value of $\overline{CLRMC}$; the miss count therefore retains its maximum value if CLRMC=0, i.e. if the miss count need not be erased.

Also when the miss count must be decremented (MCCD=1), while it is already 0 (MCZ=1), as determined by the logic circuit 44, it must retain this zero value. This is again achieved by the signal $\overline{SELMMMC}=0$. The $\overline{SELMMMC}$ signal assumes the value of zero when CLRMC=1, i.e. as soon as the second detection criterion has been met, the miss count is reset to be able to count from that instant the misses indicating the end of the series of hits in the particular range quantum.

In the second mode of operation of the miss counter, the $\overline{SELMMMC}$ signal also goes zero when MCCD·MCRSEL=1, apart from the above-mentioned cases; switch 47 will then be closed. Instead of decrementing the miss count by 1, the miss counter is reset so long as the second detection criterion is not reached.

The position of the antenna of the pulse radar apparatus, employing the video extractor, is determined by the antenna angle with respect to a fixed reference point, usually geographic north. This angle is recorded in azimuth data circuit 6. From this circuit the desired azimuth value can be transferred to the video processor 2. Azimuth data circuit 6 is adapted after each following radar pulse transmission, giving the same angular value for the entire radar sweep.

At the instant the video extractor receives a first hit of a new series of hits in a range quantum r, the initial azimuth value jb(r) of these series must be determined. This is done by storing at that instant the contents of azimuth data circuit 6 into memory 1. The initial azimuth value is kept in memory 1 until the word, of which the initial value forms a part, is erased. As soon as the series of hits meets the first detection criterion, the contents of azimuth data circuit 6 must be transferred to memory 1 in order that, at the instant the complete series of hits has been recorded, the final azimuth value je(r) will have been established. Also the final azimuth value remains in memory 1 until the particular word, of which the final value forms a part, is erased.

Figure 8:
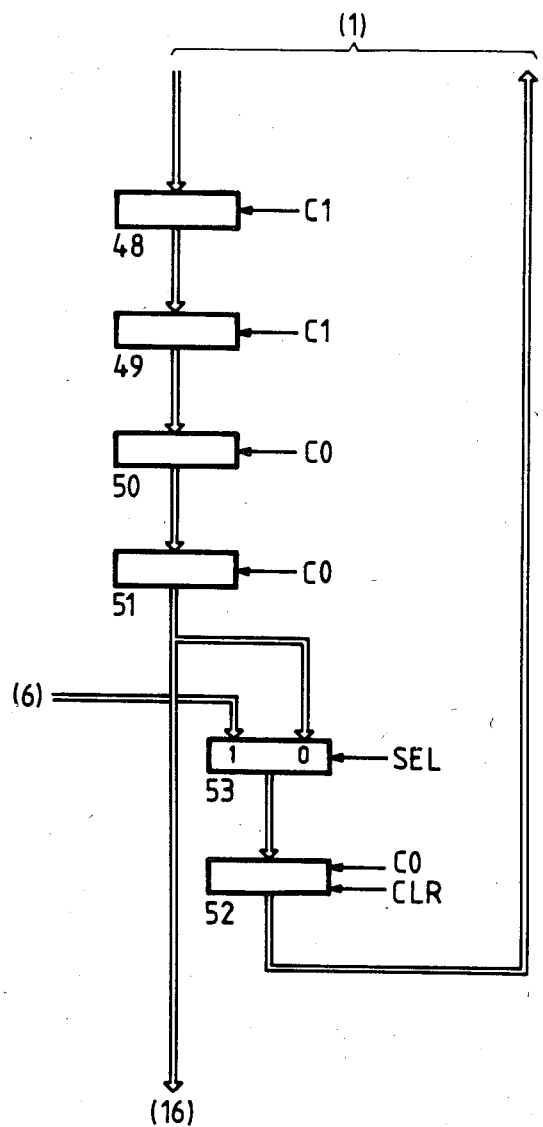
FIG. 8 is a block diagram of the jb(r) and je(r) circuit.

FIG. 8 shows a practical embodiment of both the jb(r) circuit 10 and the je(r) circuit 11. The circuit depicted comprises five azimuth registers 48 to 52 and a multiplexer 53. If this circuit represents the jb(r) circuit 10, then the SEL signal supplied to multiplexer 53 is equal to BRSEL; if on the other hand the circuit represents the je(r) circuit 11, the SEL signal equals EASEL.

First considered is the case when the circuit in FIG. 8 represents the jb(r) circuit 10. As soon as in a certain range quantum a hit of a new series of hits is recorded, the R(k) signal in control unit 14 assumes the value of 1; however, at the instant the first hit is received the R(k) signal is still 0. The signal BRSEL=ho·R(k)·M(k) transfers the azimuth value jb(r), supplied to video processor 2, to azimuth register 52 via multiplexer 53; from register 52 the jb(r) value is stored in memory 1. After placing the memory stored initial azimuth value at the appropriate position in the word associated with the particular range quantum, the C0 and C1 clock pulses clock this value, after each pulse transmission, from memory 1 successively into azimuth registers 48, 49, 50, 51 and, via multiplexer 53, into azimuth register 52, from where the value is returned to memory 1. That is, the values in azimuth registers 48 to 52 are representative of the magnitude of the initial azimuth of the series of hits in range quanta k+3, k+2, k+1, k and k−1, respectively, where k is again the running index, indicating the successive range quanta into which the range is divided. The value in azimuth register 51 is fed to readout unit 16 via line 20.

Next considered is the case when the circuit in FIG. 8 represents the je(r) circuit. As soon as in a certain range quantum the first detection criterion is met, the signal EASEL=ho·D1(k)·M(k) clocks the azimuth value supplied to video processor 2 into azimuth register 52 via multiplexer 53; from register 52 it is stored in memory 1. This azimuth value may have to be adapted after each new pulse transmission until establishing the end of the series of hits; the azimuth value then represents the magnitude of the final azimuth value je(r). After storage of an azimuth value into the memory at the final azimuth position in the word associated with the particular range quantum, the C0 and C1 clock pulses clock this azimuth value, after each following radar sweep, from memory 1 into the azimuth registers 48, 49, 50, 51 successively and, via multiplexer 53, into azimuth register 52, from which it is returned to memory 1, provided no new azimuth value need be transferred from azimuth data circuit 6. This situation occurs notably when after reaching the second detection criterion the series of hits is interrupted by a miss. The values in azimuth registers 48 to 52 finally give the magnitude of the final azimuth value of the series of hits in range quanta k+3, k+2, k+1, 1 k and k−1, respectively, where k is the running index, indicating the successive range quanta into which the range interval is divided. The value in azimuth register 51 is again applied to readout unit 16 via line 20.

For each range quantum the weight of the series of hits established therein must be determined; this is the sum of the video signal strengths detected after each successive radar sweep, that is the sum of the hit strengths. The weight of a series of hits established in range quantum r is designated by E(r).

Figure 9:
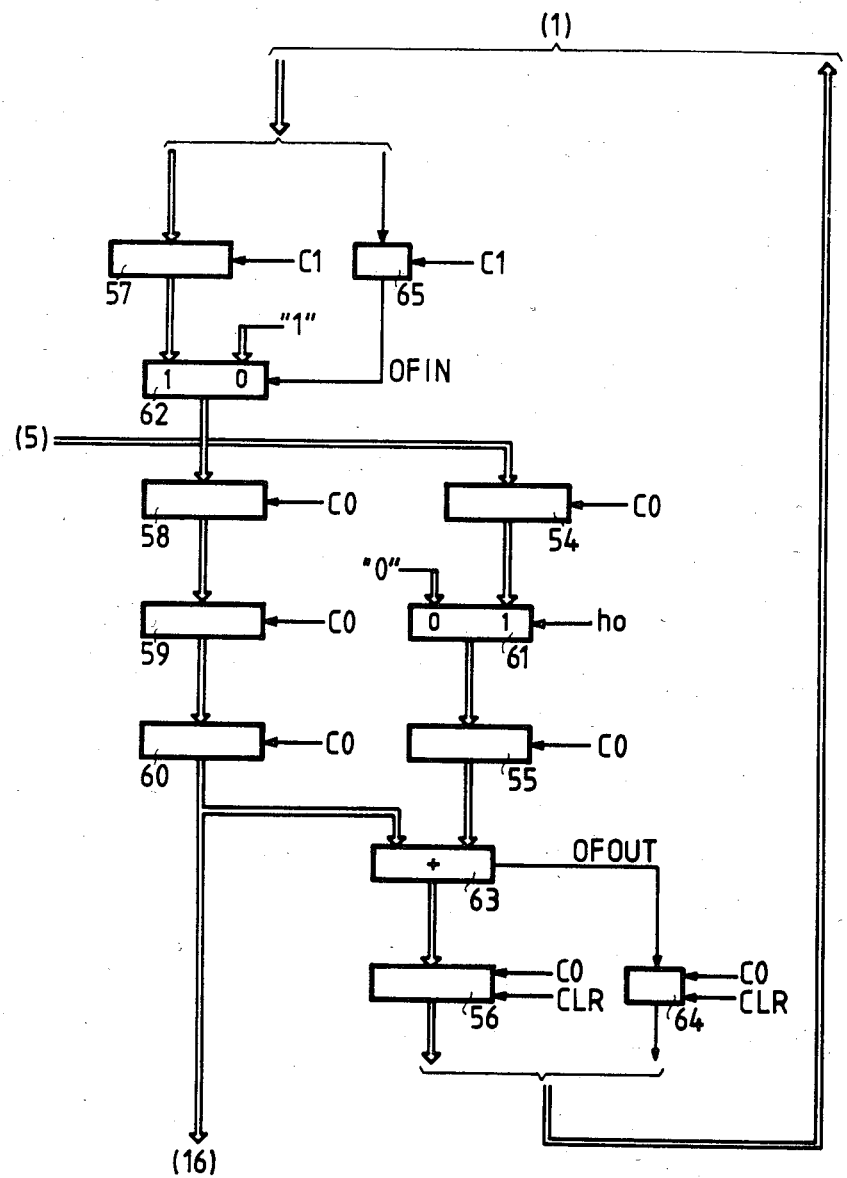
FIG. 9 is a block diagram of the E(r) circuit.

FIG. 9 shows a practical embodiment of the E(r) circuit 12. This circuit comprises seven video registers 54 to 60, two multiplexers 61 and 62, an adder circuit 63, and two register elements 64 and 65. Each radar sweep the video input circuit 5 delivers for each range quantum a digital value representative of the hit strength. This value is fed to the adder circuit 63 via video register 54, multiplexer 61 and video register 55. In adder circuit 63 the supplied hit strength is added to the sum value of hit strengths accumulated in the same range quantum during preceding radar sweeps. The adjusted sum value obtained is fed, via video register 56, to memory 1 and stored at the appropriate position of the word associated with the particular range quantum. After each following pulse transmission the C0 and C1 clock pulses clock the sum value from memory 1 successively into video register 57, via multiplexer 62 into video register 58, then into video registers 59 and 60 and, via adder circuit 63, if necessary incremented by the value of the newly supplied hit strength value, into video register 56, from which it is returned to memory 1. That is, the values in video registers 56, 58, 59, 60 and 66 are representative of the magnitude of the sum of the hit strengths of the series of hits in range quanta k+3, k+2, k+1, k and k−1, respectively, where k is the running index, indicating the successive range quanta into which the range interval is divided.

In case no hit is received (ho=0), the multiplexer 61 passes the 0 value. On establishing a complete series of hits, the sum value is no longer incremented in adder circuit 63 and the value obtained is representative of the weight E(r). In case the sum value has exceeded its maximum value to be recorded, the adder circuit 63 supplies a signal OFOUT, which is loaded into register element 64 and subsequently added to the sum value in memory 1. After the next radar sweep, the OFOUT signal and the (incorrect) sum value are read from memory 1 and loaded into register unit 65. From register unit 65 of the OFIN signal is finally derived and used to give the sum value its maximum value to be recorded, as multiplexer 62 makes all bits equal to 1. The value in video register 60 is applied to readout unit 16 via line 20.

In order that processor 7 is able to combine the series of hits established in various range quanta, in so far as they contribute to the buildup of a single target, these series of hits are provided with a number N. Thus one number is added to each target. In case several targets, each having their own number, appear to merge into one target, only one of these numbers need be maintained. The number assigned to a target determines, as already stated, the part of the memory of processor 7, in which the data of this target are stored.

Figure 10A:
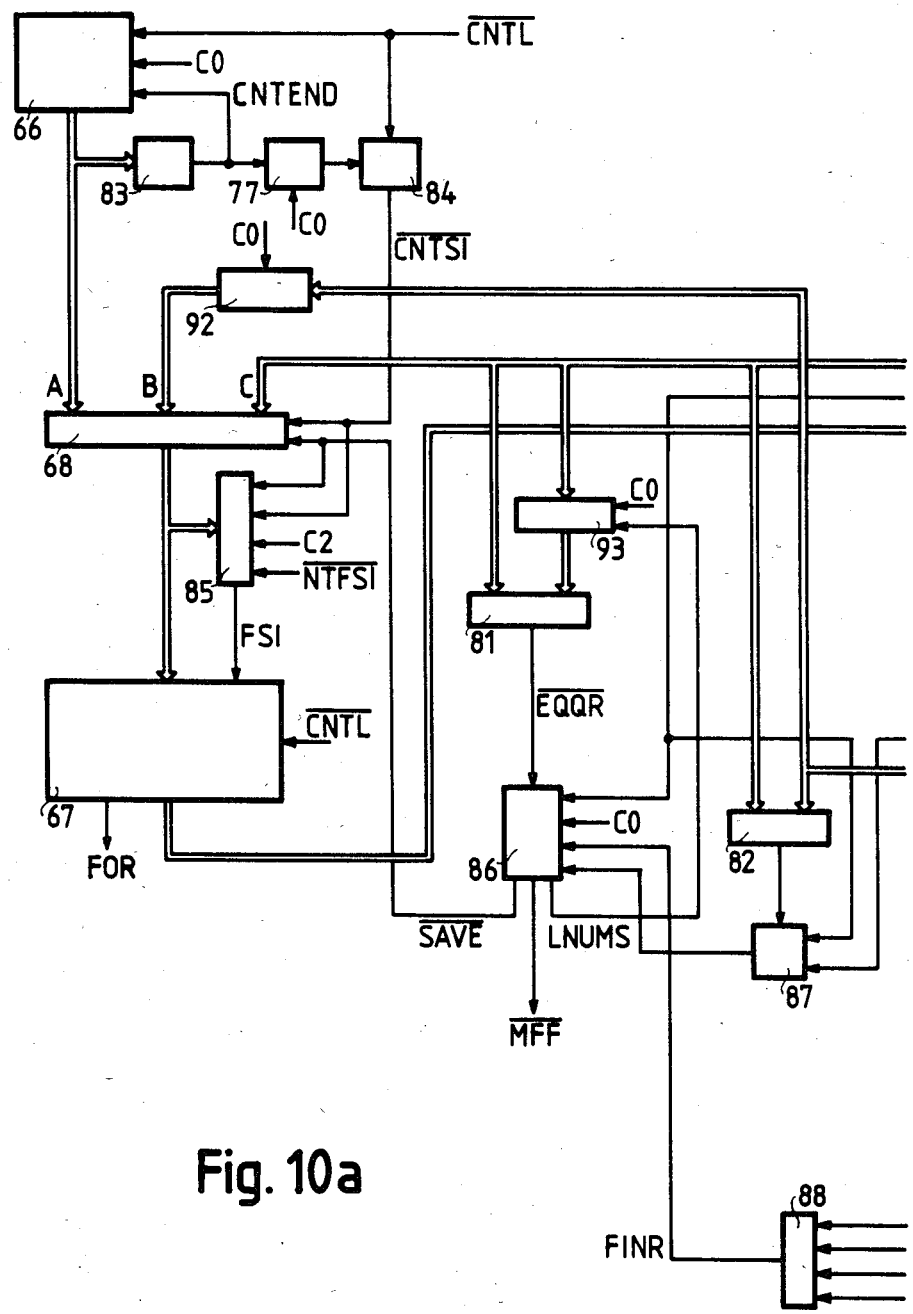
FIGS. 10a and 10b are block diagrams of the numbering circuit.
Figure 10B:
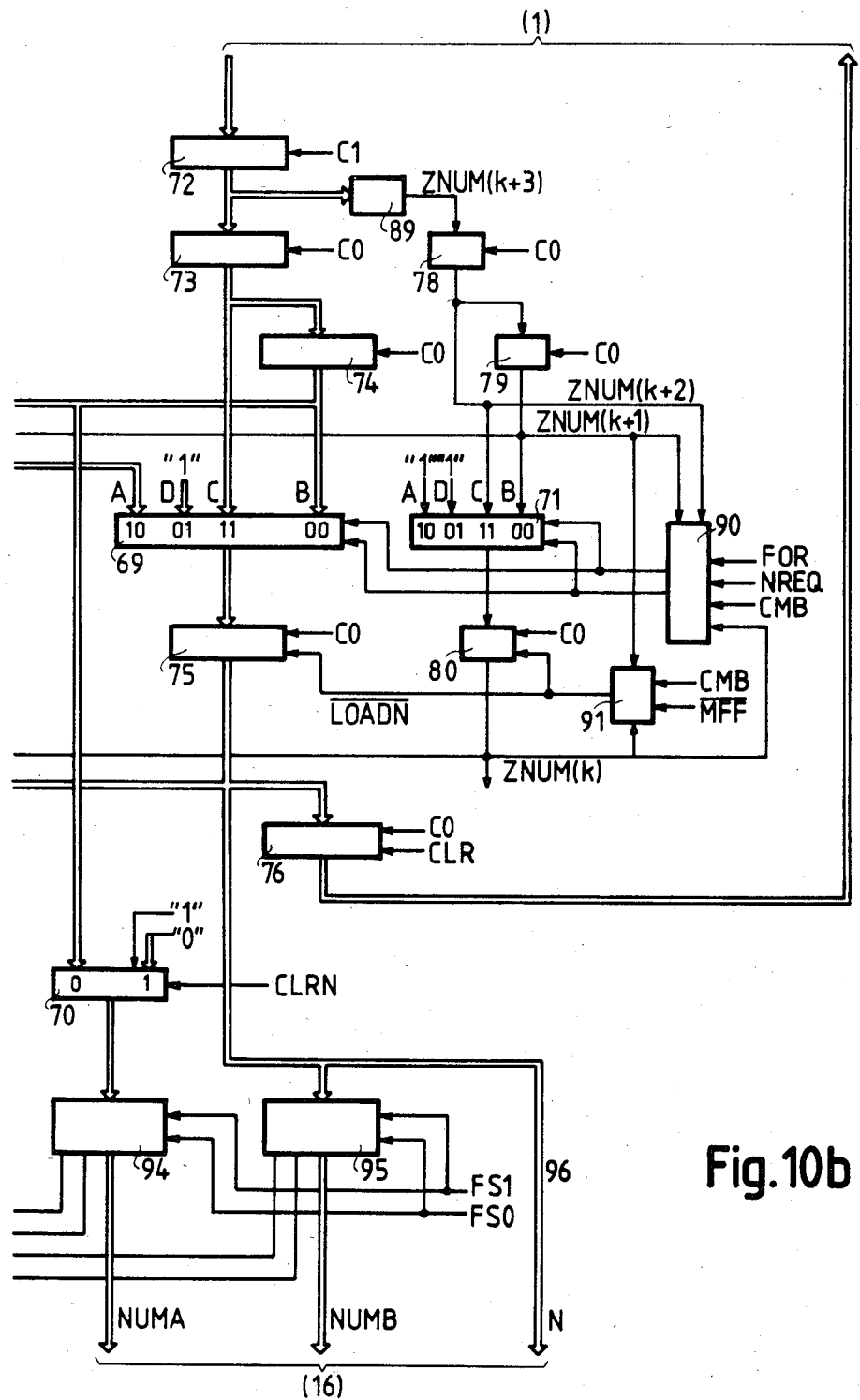
Figure 11:
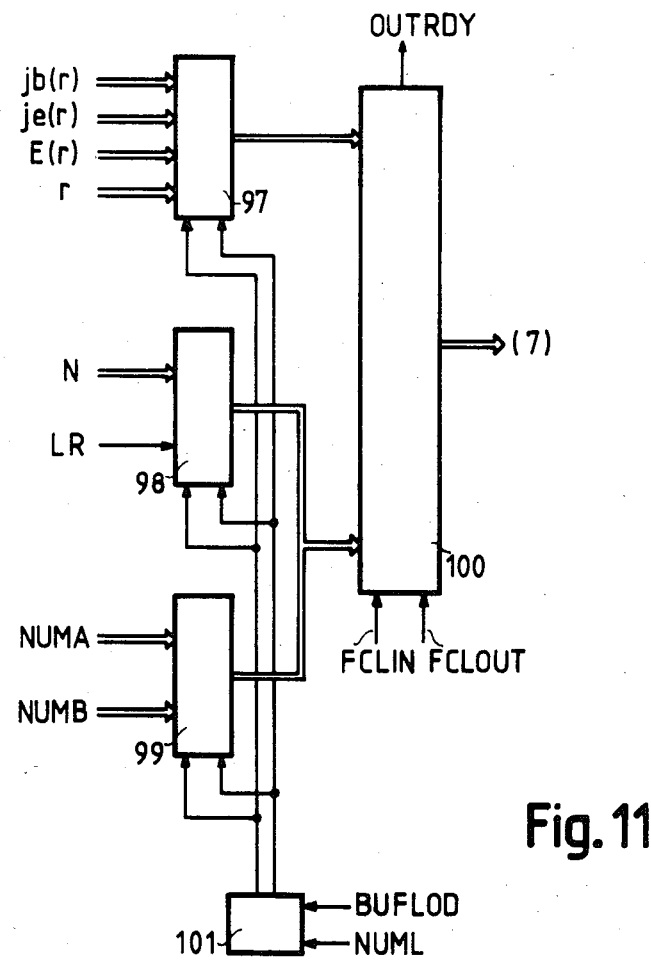
FIG. 11 is a block diagram of the readout unit.

The assignment of numbers to the particular series of hits and hence to the various targets occurs in number circuit 13. A practical embodiment of number circuit 13 is shown in FIGS. 10a and 10b forming one whole. The number circuit comprises a number generator 66, a number memory 67, multiplexers 68 to 70, a switch 71, five number registers 72 to 76, register elements 77 to 80, comparators 81 and 82, logic circuits 83 to 91, auxiliary registers 92 and 93, and two number buffer memories 94 and 95.

Upon activation of the pulse radar apparatus utilising the video extractor here described, and after one or several antenna revolutions, the start signal $\overline{CNTL}=1$ for number generator 66 is initiated. In response to this, the number generator 66 produces a series of target numbers at a frequency determined by the C0 clock pulse; these numbers are stored in number memory 67 via multiplexer 68. After delivery of the complete series of target numbers by the number generator, as established in logic circuit 83, this circuit produces the signal CNTEND=1 to stop the number generator. The C0 clock pulse clocks the CNTEND signal into register unit 77, from which it is supplied to logic circuit 84. Logic circuit 84 also receives the $\overline{CNTL}$ signal. The $\overline{CNTSI}$ output signal from logic circuit 84 is used as control signal for multiplexer 68. During the period the number generator 66 produces target numbers, the signal $\overline{CNTSI}=0$ causes input A of multiplexer 68 to be connected to its output, to enable the storage of these target numbers into number memory 67. The number memory 67 is a shift memory and is therefore based on the FIFO (first in-first out) system. If the multiplexer passes a target number from number generator 66, i.e. $\overline{CNTL}=0$, the logic circuit 85 delivers the signal FSI=1 upon the presence of the C2 clock pulse. The signal FSI=1 loads the supplied target number into number memory 67. Each time the number generator is started the signal $\overline{CNTL}=1$ resets the number memory 67. It is thus prevented that target numbers from number generator 66 are passed to number memory 67, while these numbers are still in this memory, either because they were never read out or because they were returned to the memory via inputs B and C of multiplexer 68.

On establishing a series of hits contributing to the buildup of a target, i.e. when a series of hits fulfills the miss criterion after first having met the first detection criterion, while either no target number is assigned to a series of hits in an adjoining range quantum, or a series of hits in an adjoining range quantum fails to meet the first detection criterion, a target number must be assigned to such a series of hits. The number available at that moment is transferred from number memory 67, via input A of multiplexer 69, to the number register 75, from which it is loaded into memory 1 via number register 76. With successive radar pulse transmissions, the C0 and C1 clock pulses clock the target numbers from memory 1 successively into number registers 72, 73 and 74, via multiplexer 69 into number register 75, and then into number register 76, from which they are returned to memory 1, provided they are not erased. That is, any values in registers 72 to 76 are representative of the target number assigned to any series of hits in range quanta k+3, k+2, k+1, k and k−1, respectively, where k is the aforementioned index. In order that the target be designated by one number only, the series of hits contributing to the buildup of one target should all obtain the same target number. On establishing in a certain range quantum a series of hits assigned with a number, and a series of hits in an adjoining range quantum meets the first detection criterion, the latter series of hits is to be assigned with the same number. In such a case, input A of multiplexer 69 is blocked.

If in two successive range quanta k+1 and k+2 the first detection criterion has been met and control unit 14 has delivered the CMB signal, while the series of hits in range quantum k+2 has been assigned with a target number, as indicated by signal $\overline{ZNUM(k+2)}$, and no target number has yet been assigned to the series of hits in range quantum k+1, as indicated by the signal ZNUM(k+1), the signal SELNUM=CMB·ZNUM(k+1)·$\overline{ZNUM(k+2)}$ clocks the contents of register 73, instead of that of register 74, into register 75 via multiplexer 69. At the same time the contents of register 73 will of course be clocked into register 74. Registers 74 and 75 will then contain the same target number.

If the first detection criterion has been met in two successive range quanta k and k+1 and the control unit 14 has supplied the CMB signal, while a target number has been assigned to the series of hits in range quantum k, as indicated by the $\overline{ZNUM(k)}$ signal, and no target number has yet been assigned to the series of hits in range quantum k+1, as indicated by the ZNUM(k+1) signal, the signal $\overline{LOADNUM}$=CMB·$\overline{ZNUM(k)}$·ZNUM(k+1) prevents that the contents of register 74 is clocked into register 75 on the presence of the clock pulse; the contents of register 75 remains unchanged for a period of two successive clock times and thus for two successive range quanta. Like the clocking of the target numbers of the series of hits in successive range quanta via registers 72, 73, 74 and input B of multiplexer 69, or via registers 72, 73 and input C of multiplexer 69, into register 75, where these numbers may be retained for a period of one clock time, the ZNUM(k+3) signal, derived by logic circuit 89 from the output signal of register 72 to indicate the assignment of a target number to the particular range quantum, is clocked, via register elements 78, 79 and input B of multiplexer 71, or via register element 78 and input C of the multiplexer 71, into register element 80, where it may be retained for a period of one clock time. This is how the ZNUM(k), ZNUM(k+1) and ZNUM(k+2) signals, required for the SELNUM and $\overline{LOADNUM}$ control signals and associated with the appropriate range quantum, are obtained, notably when the target number of a series of hits is taken over at the position of that of an adjoining series of hits.

Logic circuit 90 determines the control signals MUXSEL1 and MUXSEL2 for multiplexers 69 and 71:

MUXSEL1=SELNUM+FOR·ZNUM(k)·NREQ
and MUXSEL2=SELNUM+$\overline{FOR}$·NREQ.

If no target number has been assigned to a series of hits in range quantum k, i.e. ZNUM(k)=1, and control unit 14 indicates that such a number must be assigned, as indicated by the signal NREQ=1, while number memory 67 has a number available, as indicated by signal FOR=1 from this memory, then—because SELNUM=0—MUXSEL1,2=1,0 connecting input A of multiplexers 69 and 71. If no target number is supplied for the series of hits in range quantum k, which series of hits is to receive such a number, i.e. NREQ=1, and no number is available, i.e. FOR=0, then MUXSEL1,2=0,1 connecting input D of multiplexers 69 and 71. In such a case, a target number consisting of "ones" is assigned to the series of hits. If such a number is assigned to series of hits which may be from different targets, these hits cannot be processed as those assigned with a target number in the regular way. If no target number is to be assigned to a series of hits in range quantum k, for instance because this series of hits has already a target number or because it failed to meet the first detection criterion, while no target number of a series of hits in range quantum k+1 need be taken over, then MUXSEL1,2=0,0 connecting input B of multiplexers 69 and 71.

Logic circuit 91 determines the control signal $\overline{LOADN}$ for number register 75 and register element 80; $\overline{LOADN}$=$\overline{LOADNUM}$+MFF. This signal prevents that the contents of register 74 are clocked into register 75. If at that instant the register 74 contains a target number, this number will be lost—unless counter-measures are taken—as the contents of register 73 is transferred to register 74. In such a case the contents of register 75 equal that of register 76; the series of hits in the particular range quanta have received the same target number. Except in the aforementioned situation in which $\overline{LOADNUM}$=1, this will also occur when MFF=1; that is in the case of merging. If after a number of radar pulse transmissions it is found that two groups of hits merge to form one hit cluster (MFF=1) and the two groups of hits were assigned with a target number, one of the target numbers will be overwritten and lost if no counter-measures are taken. In the case when MUXSEL1,2=1,1 or $\overline{LOADNUM}$=1, register 74 does not contain a target number at the instant the target number present in registers 73 and 75 and belonging to the series of hits in range quanta k+2 and k respectively, must be assigned to the series of hits in range quantum k+1. As already stated, this assignment occurs one clock time later and results in equal contents of registers 74, 75 and 75, 76 respectively. In the case of merging, registers 74 and 75 will at a given moment contain different target numbers assigned to the two groups of hits. The presence of two different numbers in registers 74 and 75 is established by comparator 82 and logic circuit 87. If registers 74 and 75 contain a target number, indicated by $\overline{ZNUM(k+1)}$ and $\overline{ZNUM(k)}$ respectively, and these numbers are not the same, as indicated by the output signal of comparator 82, the logic circuit 87 delivers the $\overline{SMMF}$ signal, used to set a merging flip-flop of logic circuit 86. This flip-flop produces the signal MFF=1, which is indicative of a merging situation and makes $\overline{LOADN}$=1. Unless counter-measures are taken, this causes the loss of the target number in register 74.

When in a certain range quantum a series of hits is assigned with a target number, the data about this series of hits, as already stated, must be readout and fed to processor 7. In the same manner, the target number from number register 75 is supplied, via line 96, to the readout unit 16 and then to processor 7. When the furthest extending series of hits contributing to the buildup of a target has been established and the second detection criterion is not met, this data must be fed to processor 7 in order that the supplied data on the series of hits can be erased therein. To this effect the target number is transferred from number register 75 to the number buffer memory 95, while this number receives an additional code to be stored via multiplexer 70 into the number buffer memory 94. As number memory 67, these number buffer memories are of the FIFO type; the loading of these memories occurs under control of the FSI signal from logic circuit 85. The readout and hence the supply to the readout unit 16 occur under control of the FSO signal from control unit 14. In the case of merging, the two target numbers assigned to the original groups of hits must be readout. One number is thereto transferred from number register 74 to number buffer memory 94 via multiplexer 70, and the other number from number register 75 to number buffer memory 95. Multiplexer 70 is under control of the CLRN signal from the control unit 14; this signal indicates "erase target", implying that, after establishing the furthest extending series of hits contributing to the buildup of a target, it is found that the target fails to meet the second detection criterion. The CLRN signal transfers the code added to the target number to the number buffer memory 94. The NUMA and NUMB values read from the number buffer memories 94 and 95 are fed to readout unit 16.

After establishment of "end of target" in control unit 14, i.e. the furthest extending series of hits contributing to the buildup of the target has been fully recorded, or there is an "erase target" indication, a target number is available and can be returned to number memory 67 for subsequent assignment. In such a situation the target number is transferred from register 75 to auxiliary register 92, from where it is fed to the number memory 67 via input B of multiplexer 68. In case of merging, the target number of the furthest extending hit cluster in register 74 is overwritten by the contents of register 73; besides, this number is not admitted to register 75. The number would be lost if it were not stored in number memory 67 via input C of multiplexer 68. Multiplexer 68 is controlled by the $\overline{\text{CNTSI}}$ and $\overline{\text{SAVE}}$ signals; in case of merging, $\overline{\text{SAVE}}=0$. If $\overline{\text{CNTSI}}=1$ and $\overline{\text{SAVE}}=1$ the number generator 66 is inoperable and there is no number vacant through merging; in this case input B of multiplexer 68 is connected and number memory 67 can be supplied with the vacant numbers at the presence of the "end of target" or "erase target" signal. Input A of multiplexer 68 is connected as soon as $\overline{\text{CNTSI}}=0$, while input C is connected when $\overline{\text{CNTSI}}=1$ and $\overline{\text{SAVE}}=0$. The numbers supplied to memory 67 are stored upon the production of the FSI signal in logic circuit 85; this occurs under the condition CNTSI+SAVE+NTFSI, i.e. on the presence of a number via one of inputs A, B or C of multiplexer 68. The NTFSI signal from control unit 14 indicates that a number is available upon the "end of target" or "erase target" signal.

In case of merging, as already stated, there will be the situation that, at a given moment, registers 74 and 75 contain different target numbers P and Q. The number Q in register 74 is overwritten by the contents of register 73. However, number Q will not be lost, since it is returned to number memory 67, via input C of multiplexer 68. It is possible that register 73 again contains a number R, so that the merging situation will be maintained, as registers 74 and 75 again contain different numbers, viz. P and R, while comparator 82 and logic circuit 87 will keep the merging flip-flop set, so that MFF=1. In this new situation, no distinction can be made between numbers Q and R and, because the number Q is returned to the number memory 67, number R will be lost. To prevent this, auxiliary register 93, comparator 81 and logic circuit 86 are incorporated. On establishing a merging situation and MFF=1, logic circuit 86 delivers the LNUMS signal, which loads number Q, to be overwritten in register 74, into auxiliary register 93. This number is then fed to comparator 81 for comparison with number R to overwrite the contents of register 74. If numbers Q and R are different, comparator 81 delivers a signal $\overline{\text{EQQR}}=1$ to produce the $\overline{\text{SAVE}}$ signal in logic circuit 86 for entering number R in the number memory via input C of multiplexer 68. The $\overline{\text{SAVE}}$ signal is otherwise not to supply the number memory 67 with the number falling vacant through merging, the presence of which number being established by the ZNUM(k+1) signal, unless this number can indeed be read out, i.e. if space is available in number buffer memories 94 and 95. For this reason the logic circuit 86 is supplied with the FINR signal via logic circuit 88 connected to buffer memories 94 and 95.

Readout unit 16, consisting of three buffer registers 97, 98 and 99, a buffer memory 100 of the FIFO type, and a logic circuit 101, is supplied with the following values: jb(r) and je(r) from azimuth register 51 (FIG. 8), E(r) from video register 60 (FIG. 9), r from range counter 3 (FIG. 1), N fed directly from number register 75 via line 96 (FIG. 10b), the status bit LR from control unit 14, and NUMA and NUMB from number buffer memories 94 and 95 respectively (FIG. 10b). In response to the BUFLOD signal from control unit 14, the logic circuit 101 loads only the data jb(r), je(r), E(r), r, N and the status bit LR into the buffer registers. However, on the presence of the NUML signal from control unit 14, only the NUMA and NUMB values are stored, i.e. the two target numbers in the case of merging, or the target number provided with an additional code in case the particular target fails to meet the second detection criterion, so that the data thereof stored in the memory of processor 7 must be erased. The loading into buffer memory 100 is controlled by the FCLIN signal from control unit 14. The readout from this memory is controlled by the FCLOUT signal from processor 7. Buffer memory 100 uses the OUTRDY signal to indicate to control unit 14 that storage space is available for new data.

Figure 12:
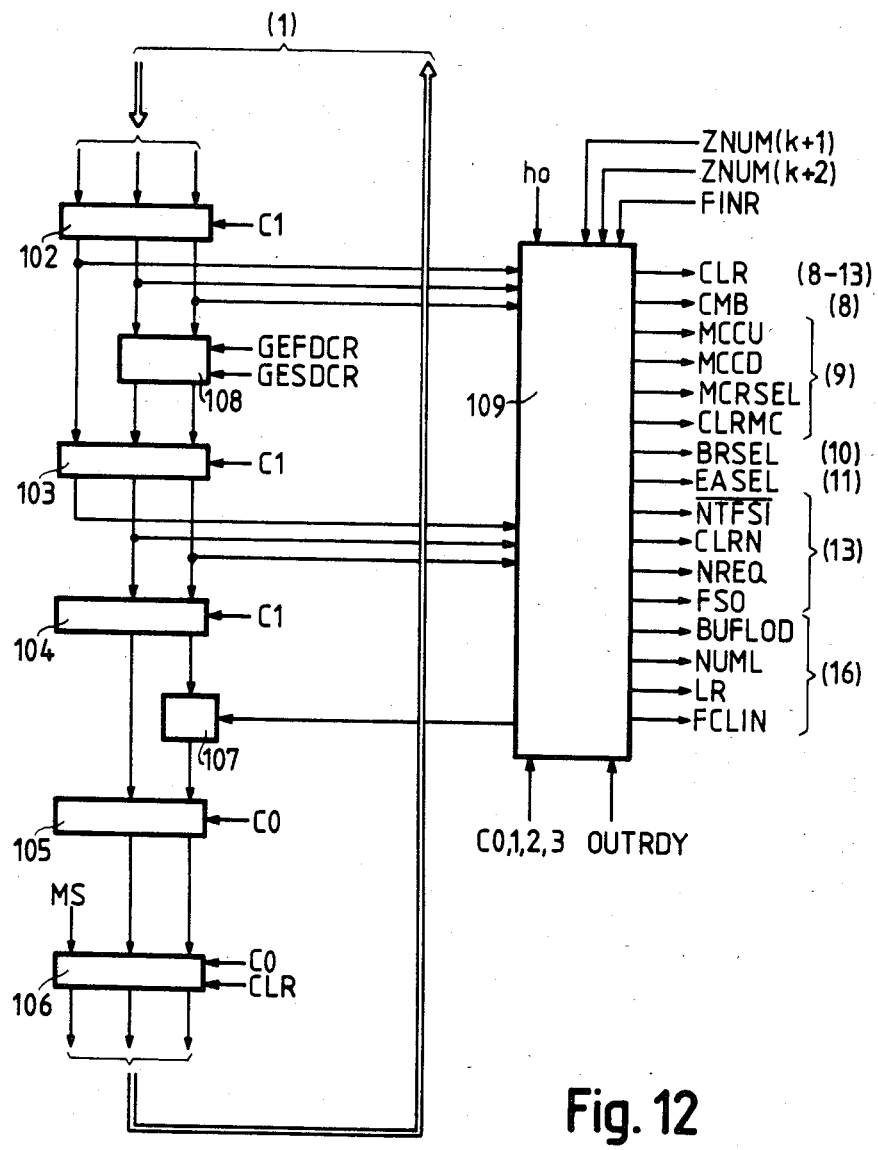
FIG. 12 is a block diagram of the control unit.

Control unit 14 supplies the control signals for hit counter 8, the miss counter 9, the jb(r) circuit 10, the je(r) circuit 11, the E(r) circuit 12, the number circuit 13 and the readout unit 16. FIG. 12 shows a practical embodiment of this control unit, comprising five control code registers 102 to 106 and three logic circuits 107, 108 and 109.

Control code b1,b2,b3 indicates whether in a certain range quantum hits have been recorded, whether a series of hits meets the first and/or the second detection criterion, or whether the miss criterion has been reached. The control codes from memory 1 for the successive range quanta are loaded into control code register 102, then modified if necessary in logic circuit 108, and transferred to control code register 103. Bits b2,b3 are clocked into control code register 104, the modified if necessary in logic circuit 107, and transferred successively to control code register 105, and control code register 106. In register 106 the newly determined value of bit 1 is added. Finally, from register 106 the control code is returned to memory 1.

Starting from the situation that in a certain range quantum no hits are recorded, so that the control code equals 000, the logic circuit 107 will change this code to 001 as soon as a hit is received in this range quantum. If subsequently the first detection criterion is reached in the range quantum concerned, as indicated by the GEFDCR signal from hit counter 8, the logic circuit 108 changes the control code to 011. If thereafter the second detection criterion is met, as indicated by the GESDCR signal from hit counter 8, the logic circuit 108 changes the control code to 010. The miss counter 9 indicates by the MS signal that the miss criterion is reached. If the miss criterion is met and the series of hits in the particular range quantum fails to meet a detection criterion, the control code is changed to 101. If the miss criterion is met, while the series of hits in the range quantum meets the first detection criterion, the control code is changed to 111. If the miss criterion is met, while the series of hits in the range quantum meets the second detection criterion, the control code is changed to 110.

The control codes of two successive range quanta are transferred to logic circuit 109. These control codes, as well as the ho signal from video input circuit 5 and the clock pulses from timing generator 15, are used in logic circuit 109 to produce various control signals. The control signals first produced are: R(k), indicating that a series of hits is being accumulated in range quantum k; D1(k), indicating that in range quantum k at least the first detection criterion has been met; D2(k), indicating that in range quantum k the second detection criterion has also been met; and M(k), indicating that in range quantum k the miss criterion has been reached.

The control signals already mentioned are:

signal CMB=D1(k+1)·D1(k+2), supplied to hit counter 8;

signals MCCU=ho·R(k)·M(k), MCCD=ho·R(k)·M(k) and MCRSEL=D2(k), supplied to miss counter 9;

signal BRSEL=ho·R(k)·M(k), supplied to the hb(r) circuit 10;

signal EASEL=ho·D1(k)·M(k), supplied to je(r) circuit 11.

The function of the signals listed below has already been indicated; they will be described in more detail hereinafter.

a. The CLRMC signal, supplied to miss counter 9. When the second detection criterion is reached, the miss count can be reset to be able to count from this moment the misses indicative of the end of the series of hits in the range quantum concerned. To this effect, control unit 14 produces the CLRMC signal from the GESDCR signal from hit counter 8.

b. The NTFSI signal, supplied to number circuit 13. The NTFSI signal indicates that a number has fallen vacant after the "end of target" or "erase target" signal. The "end of target" signal is given if the furthest extending series of hits contributing to the buildup of the target has reached the miss criterion after first having met the second detection criterion and having received a target number, while buffer memory 100 has supplied the OUTRDY signal as an indication to be ready to receive the target data. The "erase target" signal is given if the furthest extending series of hits contributing to the buildup of the target has reached the miss criterion without having met the second detection criterion. Since in this case the vacant number must also be fed to processor 7 for erasing the data about the target not having met the second detection criterion, space should be available in number buffer memories 94 and 95. For this reason, the FINR signal from number circuit 13 forms part of the "erase target" condition.

c. The CLRN signal, supplied to number circuit 13. This signal controlling multiplexer 70 is given when the "erase target" condition has been met;

d. The NREQ signal, supplied to number circuit 13. This signal is used to connect input A of multiplexer 69 and to assign a new target number to a series of hits. The NREQ signal is supplied if in a certain range quantum the miss criterion has been reached after the series of hits in this range quantum has met at least the first detection criterion, while a series of hits in an adjoining range quantum either failed to receive a target number, or failed to meet the first detection criterion, and further no number will be given by the take-over of numbers assigned to series of hits in adjoining range quanta.

e. The FSO signal, supplied to number circuit 13. This signal is used to read out the contents of number buffer memories 94 and 95. With the transfer of data to readout unit 16, the data about the series of hits established always takes precedence. The data produced by the target number in the case of "erase target" or by the two target numbers in the case of merging, i.e. NUMA and NUMB, can be transferred at special times only. The FSO signal is therefore given at these special times only, provided of course the buffer memory 100 has indicated by the OUTRDY signal to be ready to receive information;

f. The BUFLOD signal, supplied to readout unit 16. This signal indicates that data about series of hits established can be transferred. BUFLOD is given as long as the buffer memory 100 is able to receive such data, unless the NUMA and NUMB values are received at the above special times;

g. The NUML signal, supplied to readout unit 16. This signal determines the special times at which the NUMA and NUMB values can be transferred to the readout unit;

h. The LR signal, supplied to readout unit 16. This signal indicates that the applied data about the series of hits refer to the furthest extending series of hits contributing to the buildup of a target;

i. The RCLIN signal, supplied to readout unit 16. This signal indicates that data can be transferred to buffer memory 100;

j. The CLR erase signal. This signal is supplied to register 25 in the hit counter 8, the register 39 in the miss counter 9, the register 52 in the jb(r) and the je(r) circuits 10 and 11, the register 56 and register unit 64 in E(r) circuit 12, the register 76 in number circuit 13; the CLR signal is used to erase the contents of these registers and the register element. Erasure occurs on reaching the miss criterion in a certain range quantum, on assigning a target number to the series of hits established in this range quantum, and on reading out the data concerning the series of hits; besides this, there is the possibility of a general memory reset.

We claim:

1. In a video extractor for a pulse radar apparatus comprising: a first memory for storing a number of words corresponding to the number of range quanta, into which the range interval to be covered by the pulse radar apparatus is divided, said words containing target information as established for each range quantum; a range counter connected to said memory, said counter having a counting rate equal to the rate at which words are shifted in and out of memory; a video processor connected to said memory and said range counter for receiving the words shifted out of memory, said video processor being responsive to the video and angular data from the pulse radar apparatus and to the range data provided by the range counter to update the target information contained in said words with each successive range sweep and to transfer the words back into memory, the improvement wherein the video processor comprises: a first circuit connected to said memory for determining the initial and final azimuth values, jb(r) and je(r) respectively, of a series of hits for each range quantum r, whenever such a series of hits is established therein; a second circuit connected to said memory for determining the weight E(r) of a series of hits for each range quantum r, whenever such a series of hits is established therein; a third circuit connected to said memory for assigning one and the same target number N to the series of hits established in successive range quanta if such series of hits together form the picture of a single target; and a readout unit connected to said range counter and said first, second and third circuits for supplying for the successive range quanta, the respective quantity r and the respective quantities jb(r), je(r), E(r) and N, forming parts of said words, to a processor connected to said readout unit, said processor being connected to determine from said quantities, insofar they have the same target number, the centre (MR, M$\phi$), the direction $\emptyset$, the length L, the width B, and the weight $E_o$ of the target.

2. The video extractor of claim 1, wherein the processor comprises recording and memory means for establishing, for each target, the quantities:

$$E_o = \Sigma E(r),$$

$$E_R = \Sigma E(r) \cdot [r - R\text{rel}],$$

$$E_{RR} = \Sigma E(r) \cdot [r - R\text{rel}],$$

$$E_S = \tfrac{1}{2} \Sigma E(r) \cdot [(jb(r) - j\text{rel}) + (je(r) - j\text{rel})],$$

$$E_{SS} = \tfrac{1}{2} \Sigma E(r) \cdot [(jb(r) - j\text{rel})^2 + (je(r) - j\text{rel})^2] \text{ and}$$

$$E_{RS} = \tfrac{1}{2} \Sigma E(r) \cdot [r - R\text{rel}] \cdot [(jb(r) - j\text{rel}) + (je(r) - j\text{rel})],$$

where Rrel and jrel represent the relative target coordinates determined by the series of hits first received and expressed in range quanta and angular units, and processing means for:

a. determining the relative central moments, expressed in range quanta and angular units:

$$C_{RR} = E_{RR} - E_o \cdot (Z\text{rel})^2,$$

$$C_{SS} = E_{SS} - E_o \cdot (Z\phi\text{rel})^2 \text{ and}$$

$$C_{RS} = E_{RS} - E_o \cdot (Z\text{rel}) \cdot (Z\phi\text{rel}),$$

where $Z\text{Rel} = E_R/E_o$ and $Z\phi\text{rel} = E_S/E_o$ represent the centroid coordinates expressed in range quanta and angular units with respect to the relative target coordinates;

b. determining the relative central moments corrected for radar pulse length and antenna beam width:

$$VAR_{RR} = \text{Max}\{C_{RR} - E_o \cdot \sigma_R^2, 0\} \cdot (\Delta R)^2,$$

$$VAR_{SS} = \text{Max}\{C_{SS} - E_o \cdot \sigma_S^2, 0\} \cdot [(Z\text{Rrel} + R\text{rel}) \cdot \Delta R \cdot \Delta\phi]^2 \text{ and}$$

$$VAR_{RS} = C_{RS} \cdot \Delta R \cdot [(Z\text{Rrel} + R\text{rel}) \cdot \Delta R \cdot \Delta\phi].$$

where $\Delta R$ is the magnitude of a range quantum, $\Delta\phi$ the angle between two successive radar sweeps, $\sigma_R$ the correction factor for the pulse length, and $\sigma_S$ the correction factor for the antenna beam width; and c. determining the target direction $\alpha$ with respect to the line from the pulse radar apparatus to the target centroid in accordance with the relation:

$$\tan 2\alpha = \frac{2 \cdot VAR_{RS}}{VAR_{RR} - VAR_{SS}}$$

to give the target direction $\emptyset$ with respect to the selected reference direction in accordance with the relation:

$$M\phi = (Z\phi\text{rel} + j\text{rel}) \cdot \Delta\phi + \alpha.$$

3. The video extractor of claim 2, wherein the processor comprises recording and memory means for establishing, for each target, the minimum and the maximum values of r, namely Rmin and Rmax, as well as the minimum value of jb(r) and the maximum value of je(r), namely jmin and jmax, which values determine the circumscribed annular sector of the target, said processor further comprising computing means for correcting the values determining the circumscribed annular sector for radar pulse length and antenna beam width and for determining the target length by calculating the distance between the points of intersection of the line passing at an angle $\alpha$ through the target centroid and the corrected circumscribed annular sector.

4. The video extractor of claim 3, wherein the processor comprises computing means for determining the target width B in accordance with the relation:

$$B = L \cdot \sqrt{\frac{(VAR_{RR} + VAR_{SS}) - \cos 2\alpha \cdot (VAR_{RR} - VAR_{SS}) - 2 \cdot \sin 2\alpha \cdot VAR_{RS}}{(VAR_{RR} + VAR_{SS}) + \cos 2\alpha \cdot (VAR_{RR} - VAR_{SS}) + 2 \cdot \sin 2\alpha \cdot VAR_{RS}}}.$$

5. The video extractor of claim 4, wherein that processor comprises computing means for determining from the recorded values $E_o(1)$, $E_R(1)$, $E_{RR}(1)$, $E_S(1)$, $E_{SS}(1)$, $E_{RS}(1)$, Rmin(1), Rmax(1), jmin(1), jmax(1), Rrel(1) and jrel(1) of a first target and the recorded values $E_o(2)$, $E_R(2)$, $E_{RR}(2)$, $E_S(2)$, $E_{SS}(2)$, $E_{RS}(2)$, Rmin(2), Rmax(2), jmin(2), jmax(2), Rrel(2) and jrel of a second target, if the video processor (2) indicates that said first and second targets have merged to form a single new target, the values:

$E_o(N) = E_o(1) + E_o(2)$
$E_R(N) = E_R(1) + E_R(2) + E_o(2) \cdot [R\text{rel}(2) - R\text{rel}(1)]$
$E_{RR}(N) = E_{RR}(1) + E_{RR}(2) + 2 \cdot E_R(2) \cdot [R\text{rel}(2) - R\text{rel}(1)] + E_o(2) \cdot [R\text{rel}(2) - R\text{rel}(1)]^2$
$E_S(N) = E_S(1) + E_S(2) + E_o(2) \cdot [j\text{rel}(2) - j\text{rel}(1)]$ -continued
$$E_{SS}(N) = E_{SS}(1) + E_{SS}(2) + 2 \cdot E_S(2) \cdot [jrel(2) - jrel(1)] + E_o(2) \cdot [jrel(2) - jrel(1)]^2$$
$$E_{RS}(N) = E_{RS}(1) + E_{RS}(2) + E_S(2) \cdot [Rrel(2) - Rrel(1)] + E_R(2) \cdot [jrel(2) - jrel(1)] + E_o(2) \cdot [Rrel(2) - Rrel(1)] \cdot [jrel(2) - jrel(1))$$
$$Rmin(N) = Min\{Rmin(1), Rmin(2)\}$$
$$Rmax(N) = Max\{Rmax(1), Rmax(2)\}$$
$$jmin(N) = Min\{jmin(1), jmin(2)\}$$
$$jmax(N) = Max\{jmax(1), jmax(2)\},$$

all of which new values being related to the Rrel(1) and jrel(1) values.

6. A video extractor as in claim 2 characterized in that the video processor comprises a programmable signal processor.

7. A video extractor as in claim 3 characterized in that the video processor comprises a programmable signal processor.

8. A video extractor as in claim 4 characterized in that the video processor comprises a programmable signal processor.

9. A video extractor as in claim 5 characterized in that the video processor comprises a programmable signal processor.

10. The video extractor of claim 1, wherein said third circuit for assigning one and the same target number N to the series of hits established in successive range quanta, if such series of hits together form the picture of a single target, comprises: a number memory for storing said target numbers to be assigned to said series of hits; at least first, second and third register means, the input of the first register means being coupled to the first memory, the input of the second register means being connected to the output of the first register means and the output of the third register means being coupled to the first memory, and a multiplexer connected to the output of the number memory and the first and second register means and the input of the third register means, whereby the third register means receives either the target numbers stored in the first memory and to be assigned for the successive range quanta, via the first and/or second register means, or the target numbers stored in the number memory and to be newly assigned for the successive range quanta, via the multiplexer, and whereby the target numbers stored successively in the third register means can be returned to the first memory.

11. The video extractor of claim 10, wherein the video processor comprises a control unit connected to the memory, and to said first, second and third circuits and said readout unit of the video processor and said third circuit comprises logical circuits connected to outputs of the control unit and to inputs of the multiplexer and the third register means for obtaining signals to transfer, if a target number is assigned to a series of hits in a certain range quantum and no target number is assigned to a series of hits in a preceding range quantum, the target number when present in the first register means to the third register means, and to retain, if a target number is assigned to a series of hits in a certain range quantum and no target number is assigned to a series of hits in a following range quantum, the target number when present in the third register means in said register means for a period corresponding with the rate at which the words are shifted through the video processor.

12. The video extractor as claimed in claim 11, wherein said third circuit comprises a number generator and a second multiplexer the inputs of which are connected to the number generator and the second and third register means and the outputs of which are connected to the input of the number memory, via which multiplexer the number memory receives either newly generated target numbers from the number generator or numbers from the register means, falling vacant when all data of a certain target have been transferred to the processor.

13. The video extractor of claim 12, wherein said third circuit comprises a first and a second number buffer memory and a a third multiplexer, an input of the multiplexer being connected to the output of the second register means, the output of the multiplexer being connected to the input of the first number buffer register, the input of the second number buffer register being connected to the output of the third register means, both the output of the first and second number buffer register being connected to the readout unit, whereby, in the event that two targets, originally regarded to be separate, turn out to be a single target, the target numbers of the targets originally regarded to be separated and stored in the second register means are loaded, via the third multiplexer, into the first number buffer memory and those in the third register means into the second number buffer memory, and, in case the target data already transferred to the processor need no further processing therein, a code indicative thereof is loaded, via the third multiplexer, into the first number buffer memory and the number belonging to said target data into the second number buffer memory.

* * * * *

UNITED STATES PATENT AND TRADEMARK OFFICE
CERTIFICATE OF CORRECTION

PATENT NO. : 4,586,042

DATED : April 29, 1986

INVENTOR(S) : HENDRIK C. BLEIJERVELD
WILLEM VAN DEN BERG

It is certified that error appears in the above-identified patent and that said Letters Patent is hereby corrected as shown below:

COL. 19, Line 67, change "ZRel" to --ZRrel--.

Signed and Sealed this

Twenty-first Day of October, 1986

[SEAL]

Attest:

DONALD J. QUIGG

Attesting Officer

Commissioner of Patents and Trademarks